United States Patent [19]
Johnson, Jr.

[11] Patent Number: 6,026,868
[45] Date of Patent: Feb. 22, 2000

[54] TRANSPONDER DISTINCTION IN A FUELING ENVIRONMENT

[75] Inventor: William S. Johnson, Jr., Jamestown, N.C.

[73] Assignee: Gilbarco Inc., Greensboro, N.C.

[21] Appl. No.: 09/159,910

[22] Filed: Sep. 24, 1998

Related U.S. Application Data

[62] Division of application No. 08/966,237, Nov. 7, 1997.

[60] Provisional application No. 60/060,066, Sep. 26, 1997.

[51] Int. Cl.$^7$ .............................. B65B 1/30; G06F 7/04
[52] U.S. Cl. ............... 141/94; 340/825.34; 340/825.33; 340/825.35; 340/825.54
[58] Field of Search ............................ 141/94, 98, 231; 340/825.34, 825.33, 825.35, 825.54; 705/413

[56] References Cited

U.S. PATENT DOCUMENTS

| | | | |
|---|---|---|---|
| 3,536,109 | 10/1970 | Ginsburg et al. | 141/98 |
| 3,642,036 | 2/1972 | Ginsburg et al. | 141/94 |

(List continued on next page.)

FOREIGN PATENT DOCUMENTS

| | | | |
|---|---|---|---|
| 058132 A1 | 2/1994 | European Pat. Off. | 340/825.54 |
| 2 502 134 | of 1981 | France. | |
| 2 600 318 | of 1986 | France. | |
| 4113097 | 10/1992 | Germany | 141/94 |
| 42 15872 | of 1993 | Germany. | |
| 102768/2 | of 1992 | Israel. | |

(List continued on next page.)

OTHER PUBLICATIONS

Memo from CARB; Estimated Hydrocarbon Emissions of Phase II and Onboard Vapor Recovery Systems, Apr. 13, 1994.

CARB Mail–Out #94–23; Staff's Proposed Recommendation For The Adoption Of The United States Environmental Protection Agency's Vehicle Refueling Standard and Test Procedures, May 27, 1994.

Society of Automotive Engineers, Inc.; Meeting Notice, Feb.4, 1997.

SAE Meeting Notice; ORVR Interaction With Balance Phase II Vapor Recovery Systems, May 19, 1997.

SAE ORVR Task Force Agenda; Open Discussion Topics for SAE ORVR Task Force, May 29, 1997.

*Primary Examiner*—Henry J. Recla
*Assistant Examiner*—Tuan Nguyen
*Attorney, Agent, or Firm*—Rhodes Coats & Bennett, L.L.P.

[57] ABSTRACT

The present invention solves these problems by providing a fueling system capable of distinguishing between types of transponders based on the type of signals transmitted or information transmitted therein. Based on the type of transponder, the system may control dispenser functions accordingly. For example, certain applications may allow transponders carried on a person to be moved about the fueling environment during a fueling operation, but stop fueling and provide warning or instructional information if a vehicle mounted transponder begins or starts to move during the fueling operation.

The fueling system may use many various techniques to determine transponder movement within the fueling environment, and in particular, with respect to the fuel dispenser at which the fueling operation is taking place. The system may simply determine a relative change in the proximity of the transponder with respect to the dispenser, a change in location with respect to the dispenser or simply receiving data from the vehicle transmitter or other remote source that the vehicle is moving or preparing to move. Preferably, in the latter situation, the vehicle transmitter is associated with a vehicle control system capable of sending information to the transmitter indicative of the vehicle being started, placed in gear and/or actually moving. A global positioning system may be used to interact through the vehicle or part of the fueling system to provide information on the vehicle movement and location.

8 Claims, 8 Drawing Sheets

U.S. PATENT DOCUMENTS

| | | | |
|---|---|---|---|
| 3,650,303 | 3/1972 | Chambers et al. | 141/1 |
| 3,662,924 | 5/1972 | Crandall et al. | 222/64 |
| 3,786,421 | 1/1974 | Wostl et al. | 340/149 |
| 3,814,148 | 6/1974 | Wostl et al. | 141/98 |
| 4,263,945 | 4/1981 | Van Ness | 141/98 |
| 4,313,168 | 1/1982 | Stephens et al. | 364/465 |
| 4,345,146 | 8/1982 | Story et al. | 235/381 |
| 4,469,149 | 9/1984 | Walkey et al. | 141/94 |
| 4,490,798 | 12/1984 | Franks et al. | 364/550 |
| 4,532,511 | 7/1985 | Lemelson | 450/933 |
| 4,600,829 | 7/1986 | Walton | 235/439 |
| 4,714,925 | 12/1987 | Bartlett | 340/825.55 |
| 4,728,955 | 3/1988 | Hane | 342/140 |
| 4,760,533 | 7/1988 | Bydlon | 364/465 |
| 4,846,233 | 7/1989 | Fockens | 141/94 |
| 4,881,581 | 11/1989 | Hollerback | 141/113 |
| 4,887,578 | 12/1989 | Woodcock et al. | 123/519 |
| 4,897,642 | 1/1990 | DiLullo et al. | 340/825.06 |
| 4,934,419 | 6/1990 | Lamont et al. | 141/94 |
| 4,967,366 | 10/1990 | Kaehler | 364/479 |
| 5,025,253 | 6/1991 | DiLullo et al. | 450/825.06 |
| 5,058,044 | 10/1991 | Stewart et al. | 364/551.01 |
| 5,070,328 | 12/1991 | Fockens | 340/825.54 |
| 5,072,380 | 12/1991 | Randelman et al. | 364/406 |
| 5,086,389 | 2/1992 | Hassett et al. | 365/401 |
| 5,131,441 | 7/1992 | Simpson et al. | 141/209 |
| 5,156,198 | 10/1992 | Hall | 141/94 |
| 5,184,309 | 2/1993 | Simpson et al. | 364/510 |
| 5,204,512 | 4/1993 | Ieki et al. | 235/382 |
| 5,204,819 | 4/1993 | Ryan | 364/465 |
| 5,217,051 | 6/1993 | Simpson | 141/59 |
| 5,238,034 | 8/1993 | Corfitsen | 141/94 |
| 5,249,612 | 10/1993 | Parks et al. | 141/219 |
| 5,267,592 | 12/1993 | Kaplan et al. | 141/387 |
| 5,327,066 | 7/1994 | Smith | 320/2 |
| 5,327,945 | 7/1994 | Simpson et al. | 141/59 |
| 5,343,906 | 9/1994 | Tibbals, III | 141/83 |
| 5,359,522 | 10/1994 | Ryan | 365/465 |
| 5,363,889 | 11/1994 | Simpson et al. | 141/208 |
| 5,365,984 | 11/1994 | Simpson et al. | 141/387 |
| 5,383,500 | 1/1995 | Dwars et al. | 141/98 |
| 5,392,049 | 2/1995 | Gunnarsson | 342/42 |
| 5,393,195 | 2/1995 | Corfitsen | 414/749 |
| 5,414,427 | 5/1995 | Gunnarsson | 342/51 |
| 5,444,742 | 8/1995 | Grabow et al. | 375/267 |
| 5,485,520 | 1/1996 | Chaum et al. | 380/24 |
| 5,495,250 | 2/1996 | Ghaem et al. | 342/51 |
| 5,505,234 | 4/1996 | Simpson et al. | 141/206 |
| 5,535,130 | 7/1996 | Long | 705/413 |
| 5,541,835 | 7/1996 | Dextraze et al. | 364/402 |
| 5,552,789 | 9/1996 | Schuermann | 342/42 |
| 5,557,286 | 9/1996 | Hughes et al. | 340/933 |
| 5,621,411 | 4/1997 | Hagl et al. | 342/42 |
| 5,621,412 | 4/1997 | Sharpe et al. | 342/51 |
| 5,675,490 | 10/1997 | Bachhuber | 340/825.3 |

FOREIGN PATENT DOCUMENTS

| | | |
|---|---|---|
| 04-128186 | of 1992 | Japan . |
| 4-23695 | of 1992 | Japan . |
| 6-227597 | of 1994 | Japan . |
| 94/4327 | of 1994 | South Africa . |
| 2 222 714 | of 1990 | United Kingdom . |
| WO 94/06031 | 3/1994 | WIPO . |
| WO 94/05592 | 11/1994 | WIPO . |
| WO 95/14612 | of 1995 | WIPO . |
| WO 95/32919 | of 1995 | WIPO . |
| WO 96/28791 | of 1996 | WIPO . |
| WO 97/24689 | 7/1997 | WIPO . |

TRANSPONDER DISTINCTION IN A FUELING ENVIRONMENT

This application is a divisional of application Ser. No. 08/966,237, filed Nov. 7, 1997, pending, which claims the benefit of U.S. Provisional application No. 60/060,066, filed Sep. 26, 1997.

BACKGROUND OF THE INVENTION

The present invention relates generally to fuel dispensers and, more particularly to fuel dispensers capable of distinguishing between various types of transponders capable of communicating with the dispenser and detecting movement of the transponder within and throughout the fueling environment.

In recent years, traditional gasoline pumps and service stations have evolved into elaborate point-of-sale (POS) devices having sophisticated control electronics and user interfaces with large displays and touch-pads or screens. The dispensers include various types of payment means, such as card readers, to expedite and further enhance fueling transactions. A customer is not limited to the purchase of fuel at the dispenser. More recent dispensers allow the customer to purchase services, such as car washes, and goods, such as fast food or convenience store products at the dispenser. Once purchased, the customer need only pick up the goods and services at the station store or the outlet of a vending machine.

Remote transaction systems have evolved wherein the fuel dispenser is adapted to communicate with various types of remote communication devices, such as transponders, to provide various types of identification and account information to the fuel dispenser automatically. Given the sophistication of these transaction systems and the numerous choices provided to the customer at the dispenser, distinguishing between transponders carried on a person and transponders mounted in a vehicle will be useful to allow the dispenser and fuel station store to monitor the movement of a person carrying a transponder and a vehicle having a transponder. Monitoring such movement would allow the fueling system to prevent drive-offs during a fueling operation wherein the dispenser's nozzle is still in the fill neck of the vehicle's fuel tank. The additional merchandising options provided to the customer may increase the risk of drive-offs. For example, in a single visit to a service station, a customer may fuel the vehicle and pay for the fuel dispensed at the fuel dispenser and order food at an associated quick-serve restaurant. During fueling, the customer may decide to pick up the ordered food and purchase other goods in the convenience store. Given all the transactions available, the customer could easily forget to complete the fueling transaction by replacing the dispenser nozzle back in the dispenser housing, or in cases where payment at the pump was not made, the customer could forget to pay for the fuel and drive off believing the fuel is paid for when in actuality only the convenience store products or fast food was actually purchased. In other situations, customers may intend on driving off without paying for the fuel. Given the increased volume of transactions occurring at the dispenser, it is difficult to keep track of and notice a customer driving off without paying for the fuel. In any of these and other related situations, keeping track of a vehicle using a vehicle mounted transponder may prevent intentional and unintentional drive-offs without paying or completing the fueling transaction.

Keeping track of a person or vehicle throughout the fuel station environment may be beneficial in other applications, such as advertising and merchandising. Given the projected mixture of both personal and vehicle mounted transponders, distinguishing between the types of transponders is desirable in certain applications to allow persons carrying a transponder to leave the immediate fueling position at the fuel dispenser during the fueling operation while preventing or limiting movement of a vehicle during the fueling operation to prevent drive-offs as well as monitor movement of person having personal transponders.

Thus, there is a need for a fuel dispensing system capable of determining a type of transponder in addition to being able to determine movement of certain of these transponders to enhance security, safety and functionality of modem fueling environments.

SUMMARY OF THE INVENTION

The present invention fulfills this need by providing a fueling system capable of distinguishing between types of remote communication devices (generally referred to as transponders) based on the signals transmitted from the transponder, such as the type of signals transmitted or information transmitted therein. The transmitted signals may originate at the transponder or be a modification of signals originally transmitted to the transponder. Based on the type of transponder, the system may control dispenser functions differently. For example, certain applications may allow transponders carried on a person to be moved about the fueling environment during a fueling operation, but stop fueling and provide warning or instructional information if a vehicle mounted transponder begins or starts to move during the fueling operation. Vehicle transponders may also interface with the vehicle's control system or bus network to disable the vehicle and prevent movement.

The fueling system may use many different types of techniques to determine transponder movement within the fueling environment, and in particular, with respect to the fuel dispenser at which the fueling operation is taking place. The system may simply determine a relative change in the proximity of the transponder with respect to the dispenser, determine a change in location with respect to the dispenser or simply receive data from the vehicle transmitter or other remote source indicating the vehicle is moving or preparing to move. Preferably, in the latter situation, the vehicle transmitter is associated with a vehicle control system capable of sending information to the transmitter indicative of the vehicle being started, placed in gear and/or actually moving. In certain situations, a global positioning system may be used to interact through the vehicle or part of the fueling system to provide information on vehicle movement and location.

Accordingly, a fuel dispenser is disclosed having a fuel delivery path, a pump associated with the delivery path for pumping fuel from a storage tank to a fueling nozzle and a controller and communication system adapted to receive remotely transmitted signals from transmitters of different types. The controller is adapted to determine the type of transmitter from which the remotely transmitted signals were received, and preferably, whether or not the transmitter is or is about to be moved with respect to the dispenser. The controller and communication electronics may rely on varying signal characteristics to determine proximity or location depending on the sophistication of the system or respond to information in the transmitted signals indicating the vehicle is moving.

The controller may be associated with one or more antennas placed anywhere within the fueling environment, including within or one or more dispensers. The signals received at one or more of these antennas may be monitored to determine changes in signal characteristics indicative of movement of the transmission source. For example, determining proximity changes may include monitoring signal strength, magnitude or changes in phase. Using multiple antennas and known locating techniques, such as triangulation, based on signal characteristics received at each antenna, the location and movement of transmitters and items or persons associated therewith may be tracked or monitored for movement.

DESCRIPTION OF THE DRAWINGS

These and other aspects of the present invention will become apparent to those skilled in the art after reading the following description of the preferred embodiments in view of the drawings.

DETAILED DESCRIPTION OF THE PREFERRED EMBODIMENTS

In the following description, like reference characters designate like or corresponding parts throughout the several figures. It should be understood that the illustrations are for the purpose of describing preferred embodiments of the invention and are not intended to limit the invention thereto.

Figure 1:
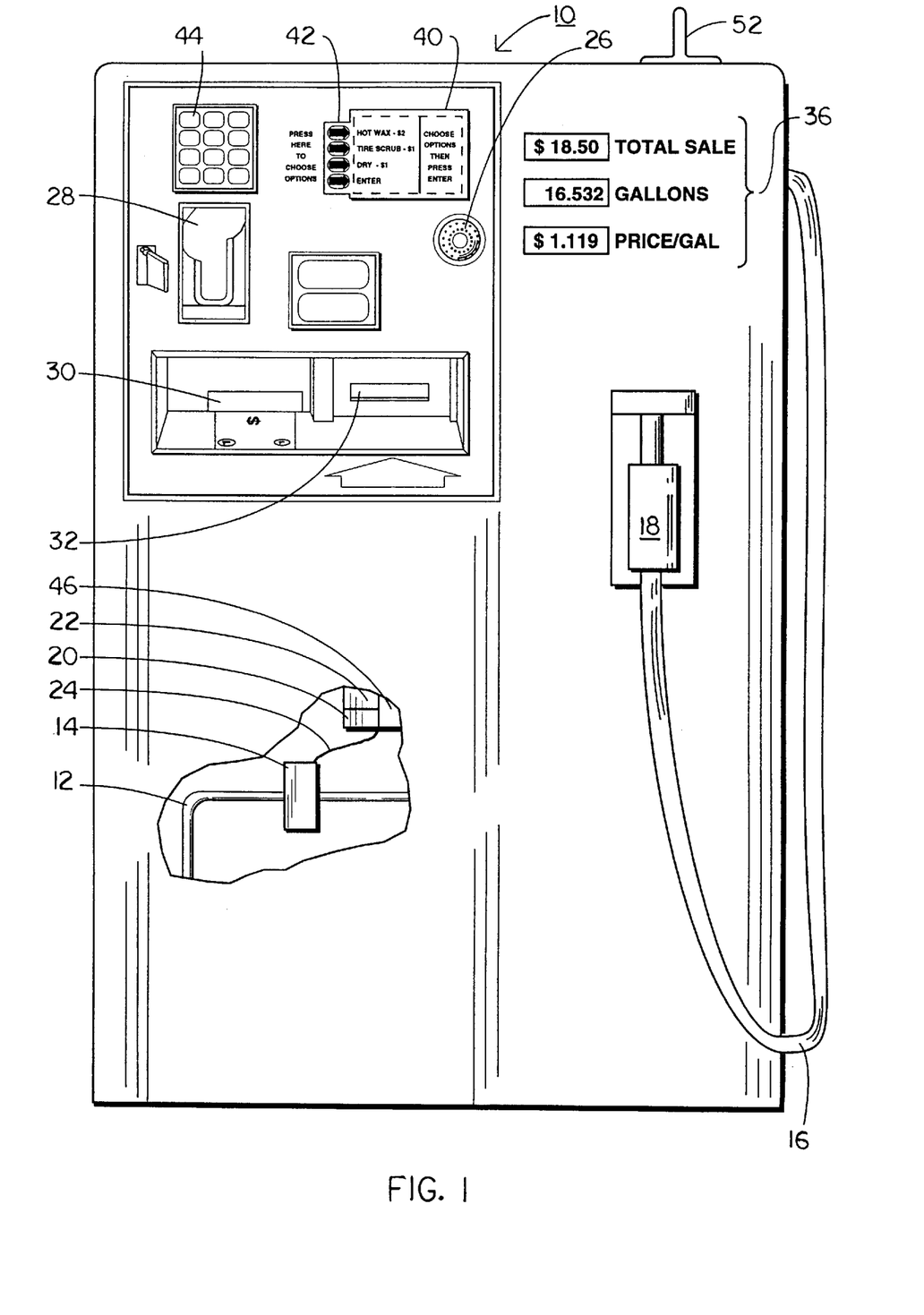
FIG. 1 is an elevational view of a fuel dispenser constructed according to a preferred embodiment of the invention.
Figure 2:
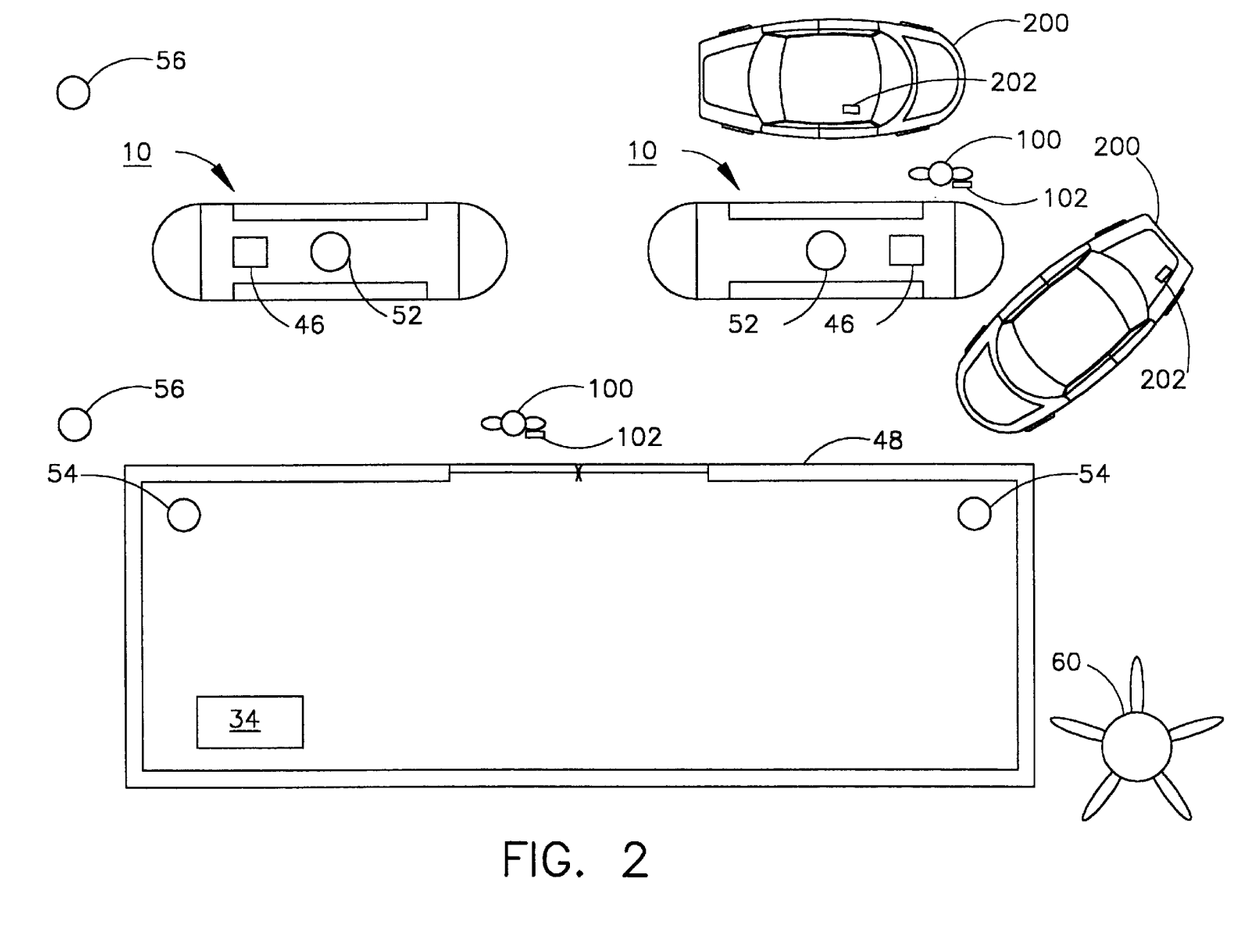
FIG. 2 is a schematic representation of a fueling environment according to a preferred embodiment.
Figure 3A:
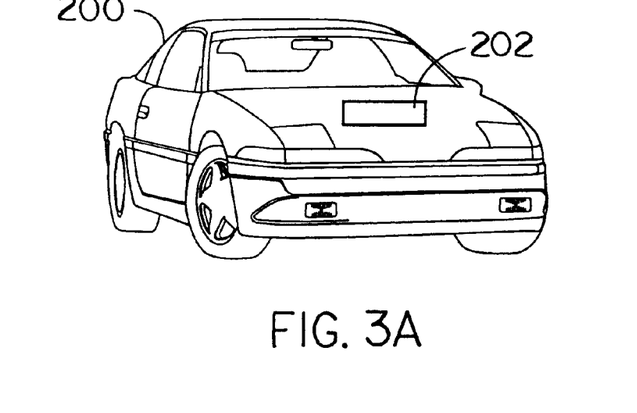
FIG. 3A is a schematic of a vehicle having a remote communication device according to a preferred embodiment.

As best seen in FIG. 1, a fuel dispenser, generally designated 10, is shown constructed according to the present invention. The fuel dispenser provides a fuel delivery path from an underground storage tank (not shown) to a vehicle 200 (shown in FIGS. 2 and 3). The delivery path includes a fuel delivery line 12 having a fuel pump/metering device 14. A fuel delivery line 12 communicates with a fuel delivery hose 16 outside of the dispenser 10 and a delivery nozzle 18. The nozzle 18 provides manual control of fuel delivery to the vehicle 200.

The dispenser 10 also includes a control system having a controller 20 and associated memory 22. The controller may receive volume data from the pump/meter device 14 through cabling 24 as well as provide control of fuel delivery. The controller 20 may provide audible signals to an audio module and speaker 26 in order to provide various beeps, tones and audible messages to an operator. These messages may include warnings, instructions and advertising.

The dispenser 10 may include a card reader 28 or a cash acceptor 30 and a receipt printer 32. With these options, the dispenser controller 20 may read data from the magnetic strip when a card is inserted in the card reader 28 and communicate to a service-station-based controller 34 (as shown in FIG. 2), such as the G-site controller sold by Gilbarco, Inc. of Greensboro, N.C. The service station based controller 34 generally communicates with a remote credit card verification authority to ascertain whether a transaction proposed to be charged to or debited from the account associated with the card inserted in the card reader 28 is authorized.

The dispenser 10 may also include various types of displays, preferably, one or more alpha numeric displays 36 in addition to a high resolution graphics display 40. Preferably, the graphics display 40 will have an associated graphics display keypad 42 adjacent the display or integrated with the graphics display 40 to provide a touch screen interface. The dispenser may include an additional general keypad 44. Notably, the displays 36, 40 and keypads 42, 44 may be integrated into a single device. The controller 20 is desirably comparable to the microprocessor based control systems used in CRIND (card reader in the dispenser) and TRIND (tag or transponder reader in the dispenser) type units sold by Gilbarco, Inc. under the trademark THE ADVANTAGE.

The dispenser controller 20 will have or be associated with communication electronics 46 for providing remote unidirectional or bidirectional communications between a transponder and the dispenser. The transponders may be passive or active, depending on the desired functionality and application, and is intended to include remote communication devices independently generating a transmission signal as well as those adapted to modify received signals for transmission back to the dispenser. In short, the transponder (or remote communication unit) is capable of communicating information in any remote manner to the dispenser communication electronics 46. The transponder may operate to transmit and receive signals as typical with transmitters and receivers or modify signals received in order to communicate information without actually generating a new transmission signal. The transponder may incorporate the Micron MicroStamp™ produced by Micron Communications, Inc., 8000 South Federal Way, Boise, Id. 83707-0006. The Micron MicroStamp engine is an integrated system implementing a communications platform referred to as the MicroStamp standard on a single CMOS chip. A detailed description of the MicroStamp engine™ and the method of communication is provided in its data sheets and the MicroStamp Standard Programmers Reference Manual provided by Micron Communications, Inc. These references and the information provided by Micron Communication on their web site at HTTP://WWW.MCC.MICRON.COM are incorporated herein by reference.

The remote communication electronics sending or modifying a signal originating from the dispenser is generally referred to as a transmitter. In short, "transmitter" is intended to encompass both traditional transponder and independent transmitter embodiments. Communications may include RF, infrared, acoustic or other known remote communication methods acceptable for use in a fueling environment. The dispenser associated communications electronics 46 may include a receiver, transmitter or an integrated transceiver to perform such remote communications. Preferably, the communications electronics 46 take the form of an interrogator. The communication electronics 46 include or are associated with any number of antennas located in or around the dispensers and fueling environment. In particular, these antennas may include a dispenser antenna 52, a store antenna 54 located on or near the fuel station store 48 or an area antenna 56 located anywhere throughout the forecourt or fueling environment around the fuel station store 48, as depicted in FIG. 2. The communications electronics 46 may be associated with any one or more of these various types of antennas 52, 54, 56.

In operation, a customer will drive into the fueling environment and up to a fuel dispenser 10 in a vehicle 100. Depending on the type of remote communications unit or transponder, the vehicle 100 may be equipped with a vehicle transponder 202. The person may be carrying a personal transponder 102 or both the vehicle 200 and the person 100 may have their respective transponders 102, 202. The controller 20, in association with the communication electronics 46 is adapted to determine the type of transponder (personal transponder 102 or vehicle transponder 202) based on data transmitted or the type of signal transmitted to the dispenser 10. Regardless of how the determination is made, the controller 20 determines the type of transponder and provides an output if a vehicle transponder 202 is detected and attempts to move during a fueling operation. If a personal transponder 102 is detected, the controller may not provide an output if movement of the person 100 is detected.

The invention prevents accidental drive-offs during a fueling operation by shutting off fuel delivery, providing an audible announcement through the audio module and speaker 26, disabling the vehicle or a combination thereof. The fueling operation may include the actual delivery of fuel as well as any time after fueling is completed to ensure proper payment for fuel or other goods and services, is or has been made. Thus, the system acts to prevent accidental and intentional drive-offs which could result in damage to the dispenser equipment and persons in the fueling environment as well as theft of fuel.

In short, the controller 20 allows for movement of personal transponders 102 throughout the fueling environment during a fueling operation, but provides an alert or control function when movement or a specific amount of movement by a vehicle mounted transponder 202 is detected during the fueling operation.

Figure 3B:
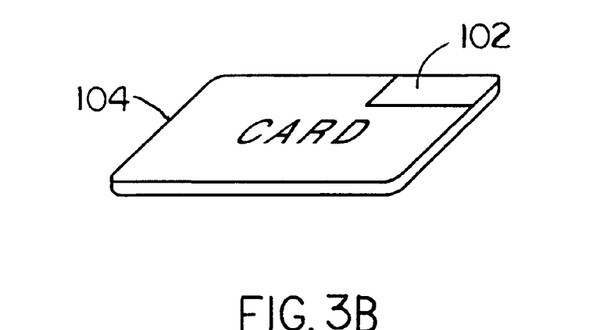
FIG. 3B is a card device having a remote communications device according to a preferred embodiment.
Figure 3C:
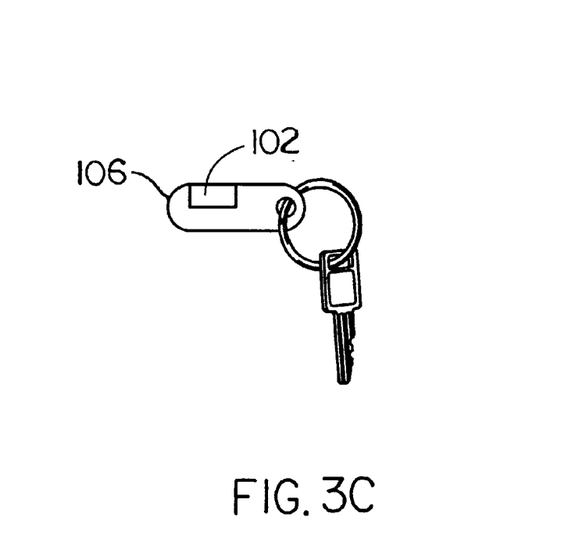
FIG. 3C is a key fob having a remote communications device according to a preferred embodiment.

A few of the numerous possibilities for transponder type and location are shown in FIGS. 3A–3C. FIG. 3A depicts a vehicle 200 having the vehicle mounted transponder 202, while FIGS. 3B and 3C depict a personal-type transponder 102 integrated within a debit, credit or smartcard 104 and a key fob 106. The transponders 102, 202 may take any number of forms to facilitate the inventive concept disclosed herein.

Figure 4:
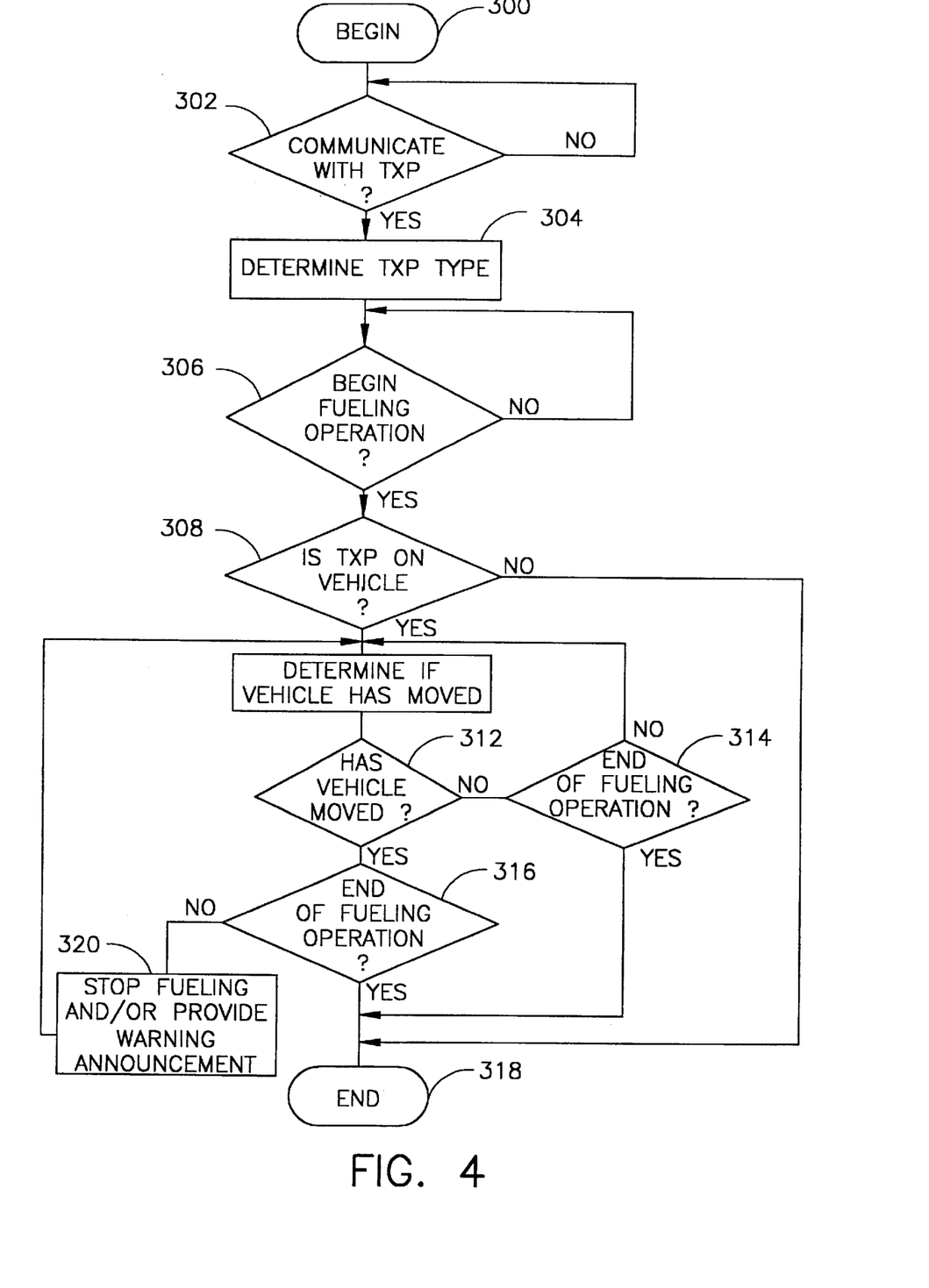
FIG. 4 is a flow chart depicting operation of a dispenser constructed according to a preferred embodiment.

Attention is directed to the flow chart shown in FIG. 4 wherein the controller 20 and communication electronics 46 begin by monitoring for the presence of a personal transponder 102 or a vehicle transponder 202 (block 300). Once the controller 20, in conjunction with the communications electronics 46, detects and begins communication with a transponder 102, 202 (block 302), the controller 20 determines the type of transponder, either personal 102 or vehicular 202 (block 304), by monitoring the type or characteristics of the signals transmitted from the transponder 102, 202 or by reading information transmitted by the signals. The transponder and controller are, of course, pre-configured to use one or more of these methods.

Depending on the application, the controller 20 may send out continuous or periodic signals for a transponder 102, 202 to respond to. The transponder 102, 202 may send back a specific type of signal or information on a carrier signal to alert the controller 20 that a transponder is within the range of communications. In such cases, the transponder may respond with a separate signal or modify the signal emanating from the controller 20 in a manner detectable by the controller 20. In other situations, the transponder 102, 202 may initiate transmission by transmitting periodic or continuous signals for the controller 20 to detect when the transponder is within a proximity capable of carrying out communications. Attention is drawn to patent application Ser. No. 08/759,733, filed Dec. 6, 1996 and assigned to Gilbarco, Inc., the disclosure of which is incorporated herein by reference. The controller 20 next monitors for the beginning of a fueling operation (block 306). Once the fueling operation begins, the controller 20 monitors for movement of the vehicle transponder 202 with respect to the fuel dispenser 10. Preferably, if the transponder is a personal transponder 102 and not a vehicle transponder 202, the controller will not monitor to determine movement with respect to the dispenser 10 (block 308) and will end monitoring of transponder movement (block 318). However, certain applications may require monitoring of the personal transponder 102 and person 100 throughout the fueling environment and fuel station store 48.

If the fueling operation has begun and the transponder is a vehicle transponder 202 (block 308), the controller 20 will monitor signals transmitted from the vehicle transponder 202 to determine if the vehicle is moving or is about to be moved (block 310). If the controller does not detect movement of the vehicle 200 or vehicle transponder 202 (block 312), the controller 20 will determine if the end of the fueling operation has occurred (block 314). If the fueling operation is not at an end, the controller 20 will continue monitoring to determine if the vehicle is or is about to be moved (block 310). If the vehicle has moved (block 312), the controller 20 determines if the fueling operation has ended (block 316). If the fueling operation is at an end, the controller may end the monitoring process (block 318). If the fueling operation is not at an end, the controller 20 will stop fueling, provide an instructional or warning announcement (block 320). The controller 20 may continue to monitor movement and continue fueling and/or control the warning or instructional announcement if movement stops or as the situation dictates. The process will generally continue until the end of the fueling operation. In certain applications, for example, where additional goods or services have been purchased, transponder monitoring may continue until the customer leaves the fueling environment.

The controller 20 operating in conjunction with the communication electronics 46 may determine movement of a transponder 102, 202 by detecting a change in relative proximity of the transponder 102, 202 with respect to the fuel dispenser 10, by detecting a change in location of the transponder 102, 202 with respect to the fuel dispenser 10 or by receiving information from the transponder indicative of transponder movement. In the latter case, the electronics associated therewith, will determine whether or not the transponder is moving. For example, the vehicle transponder 202 may be operatively associated with the control system of the vehicle 200, and the vehicle may send a signal or data via a signal to the transponder when the car is preparing to move. This may be triggered if the vehicle is started, placed in gear or actually placed in motion, although any technique of sensing movement or imminent movement may be used. The controller 20 and the dispenser 10 may read the signal or the data thereon and control fuel delivery or any audible warnings or announcements accordingly.

Alternatively, the controller 20 may determine a change in the relative proximity of a transponder 102, 202 with respect to the dispenser 10 by monitoring changes in characteristics of the transmitted signal, such as magnitude or phase. A change in magnitude or phase is highly indicative of the transponder moving with respect to the dispenser 10. Such a magnitude change may be detected by incorporating automatic gain control circuitry in the receiver portion of the interrogator or communication electronics 46 to determine signal strength. Preferably, the gain control circuitry feeds an output indicative of signal strength to an analog to digital converter to turn the analog signal into a digital string. Changes in the string value are indicative of movement. Preferably, each dispenser will include or be associated with one or more dispenser antennas 52. However, any type of receiver or antenna, including the store antennas 54 and area antennas 56 may receive signals from the particular transponder and measure such characteristics to determine relative movement, since in certain applications, any movement of the transponder may be cause for alarm.

As another alternative, the controller 20 and the associated communication electronics 46 may cooperate with a transponder 102, 202 to determine a specific location of the transponder in the fueling environment or with respect to a fuel dispenser 10. Generally, two or more antennas, such as the dispenser antennas 52, store antennas 54, area antennas 56 or any combination thereof, may be used to determine the exact or relative location of a transponder in the fueling environment. For example, the signals received at the various antennas or receivers transmitted from a single transponder may be analyzed to compute a location. For example, the phase difference of the signal received at the various antennas 52, 54, 56 will provide information sufficient to determine location. Those skilled in the art will quickly recognize the numerous techniques for determining location with one, two or more antennas or receivers. Furthermore, the communication electronics 46 may be adapted to receive signals from the transponder or other source indicative of a vehicle location provided by a regional or global positioning system via satellite 60.

In several aspects of the present invention, it is desirable to determine the location and/or proximity of a transponder, whether vehicle mounted or carried by a customer, with respect to a specific fueling position of a dispenser or interrogation system. In other aspects, it is desirable to track the transponder throughout the fueling environment. Although the embodiments described herein use the dispenser as a reference, any of the interrogation systems in the fueling environment may be adapted to determine transponder location and/or proximity.

Determining location and proximity of a transponder with respect to a fuel dispenser in a fueling environment presents a unique problem because the fueling environment includes multiple dispensers with multiple positions. At any given time, numerous transponders will be in or moving about the fueling environment and the many interrogation fields associated with the various interrogators. The dispensers and associated control systems must distinguish between personal and vehicle-mounted transponders used to carry out a transaction from transponders attached to a vehicle driving by the fueling position or carried by a person walking by the dispenser. Fueling environments must be able to avoid communicating with a second transponder during a transaction with a first transponder.

Texas Instruments has made an attempt at implementing a system in a fueling environment capable of communicating with transponders. The beta sites for the Texas Instruments system are believed to communicate with transponders using an interrogator transmitting an interrogation signal having a 134 kHz carrier. Any transponders within range of the 134 kHz signal will transmit a signal back to the interrogator using a 903 MHz carrier. The Texas Instruments system includes a very large loop antenna associated with the dispenser for transmitting the 134 kHz signal and a much smaller antenna for receiving the 903 MHz signal from the transponder. The 134 kHz transmission signal from the interrogator has a very limited communication range, which requires the transponder to be within 2–6 inches of the large loop antenna to provide the transponder sufficient energy to transmit information back to the interrogator. Additionally, the 903 MHz signal transmitted from the transponder to the interrogator is substantially non-directional and can be heard throughout the entire fueling environment and most likely for quite some distance outside the fueling environment. Transponder transmissions carrying throughout the fueling environment add significant difficulty in correlating a transponder with the proper dispenser and respective fueling position.

In addition to the inherent difficulties in locating and distinguishing between transponders within the fueling environment, the Texas Instruments system requires different types of antennas, modulation schemes and communication electronics for transmitting and receiving signals to and from the transponders. Given the limited operating field provided by the 134 kHz loop antenna, it may be difficult to communicate with vehicle-mounted transponders, which necessarily should never be within 2–6 inches of the fuel dispenser.

Applicant's invention provides a solution to the difficulties of locating and communicating with transponders within the fueling environment by (1) providing a communications system operating at frequency ranges which are very directional, (2) controlling the power at which the communications system operates and (3) simplifying the communications electronics by operating at the same carrier frequencies communicating with the transponder. Communicating at substantially the same carrier frequency allows interrogators to use the same or similar antennas to transmit and receive. Furthermore, these more directional frequencies require smaller antennas, which are easily integrated into the fueling environment or dispenser in an economical and aesthetically acceptable manner.

Figure 5:
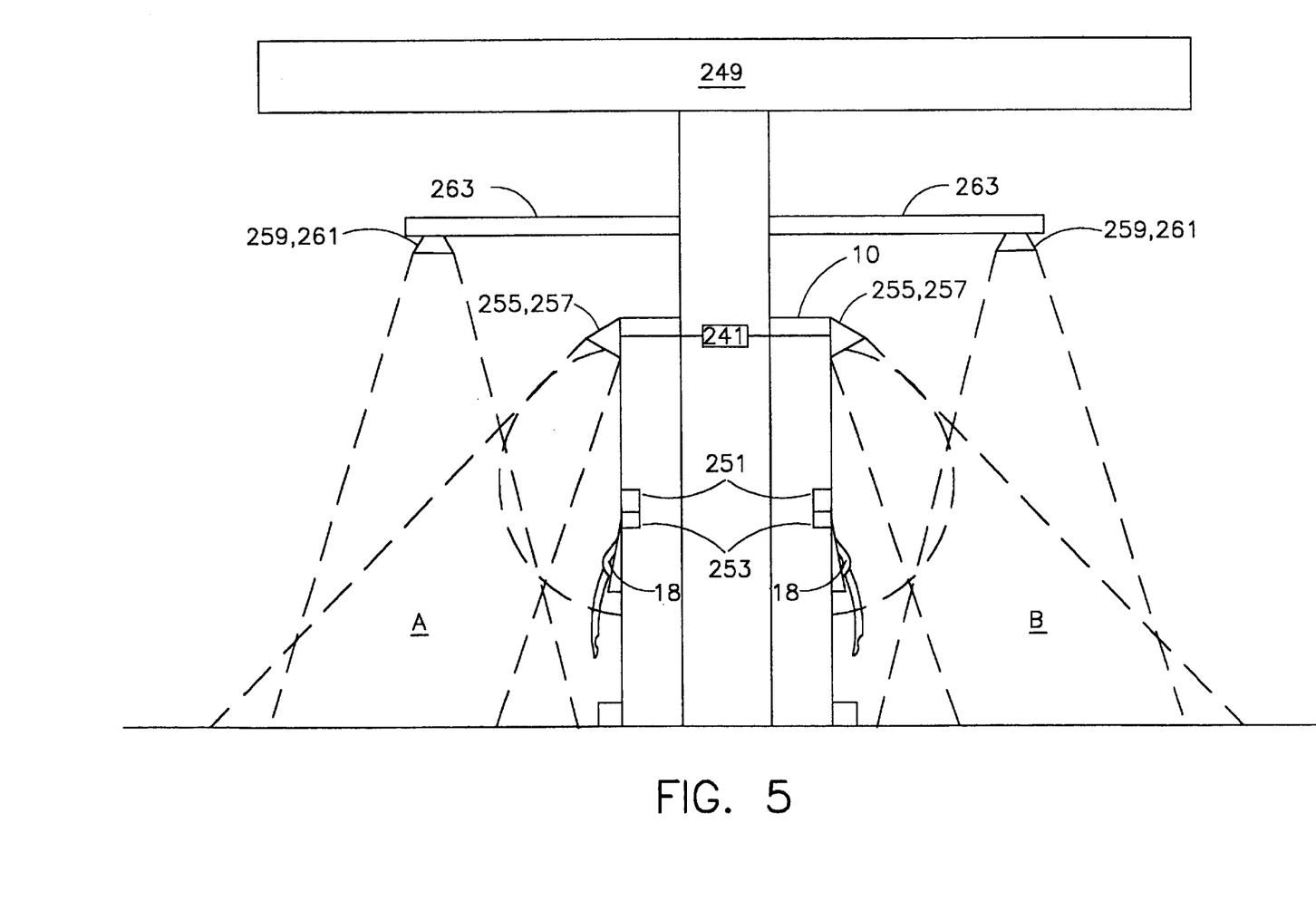
FIG. 5 is a schematic representation of a side view of a dispenser having multiple antenna arrangements for providing directional interrogation fields constructed according to the present invention.
Figure 6:
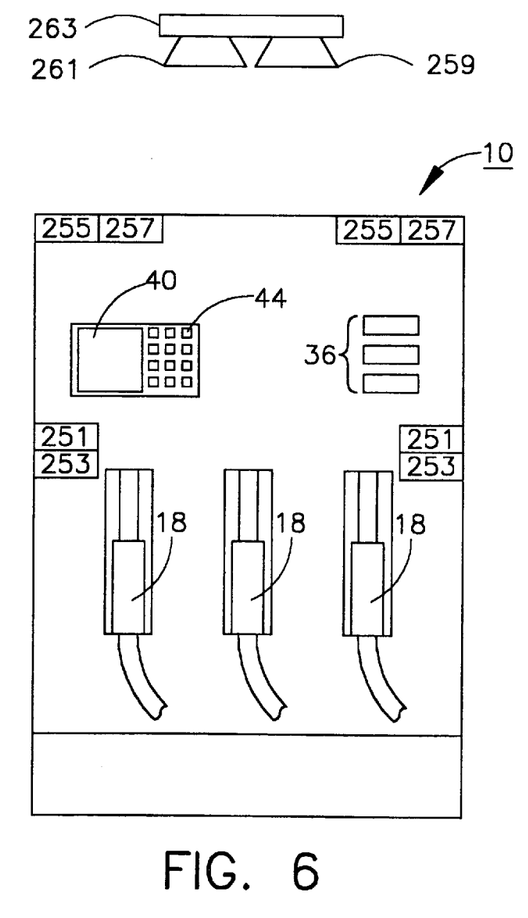
FIG. 6 is a schematic representation of a front view of a dispenser having multiple antenna arrangements for providing directional interrogation fields constructed according to the present invention.

The preferred arrangement of applicant's antennas is shown in FIGS. 5 and 6. In FIG. 5, a side view of a fuel dispenser 10 under an awning 249 is shown with multiple configurations of antennas adapted to communicate with various transponders proximate to either of the fueling positions A or B. The antennas are adapted to transmit, receive or transmit and receive at substantially directional frequencies, including those in the microwave range, and preferably around about 2.45 GHz. In these embodiments, there are basically three suggested antenna locations wherein various combinations of antennas at these locations are used. Please note that the antennas of FIGS. 5 and 6 are not referenced as 108, for the sake of clarity in describing antenna placement.

The first antenna location is near the middle of a front face of the dispenser 10. A mid-dispenser transmit antenna 251 and mid-dispenser receive antenna 253 are placed near this midpoint. The antennas may be located in the central portion of the dispenser or located anywhere along the front face of the dispenser, including near the respective sides of the dispenser as shown in FIG. 6. The mid-dispenser antennas 251, 253 preferably provide a limited power and limited range field pattern to communicate with a transponder 102 carried by a customer. The field provided by the mid-dispenser transmit antenna 251 is preferably large enough to properly communicate with the customer-carried transponder 102 in the fueling position and in front of the dispenser without requiring the customer to remove the transponder from a purse, wallet or pocket and wave the transponder next to the dispenser 10 or a receiving antenna.

Additionally, a top-mount transmit antenna 255 and top-mount receive antenna 257 may be provided at or near the top of the dispenser 10 and adapted to provide a focused, directional and preferably conically shaped field downward over the respective fueling position. These top-mount antennas 255, 257 are preferably located on each side of the dispenser 10 as shown in FIG. 6 in similar fashion to the preferred placement of the mid-dispenser antennas 251, 253. The duplication and spacing of these antennas help avoid interference caused by people or other objects breaking the communication path between the respective antenna and transponder. This allows the transponder to communicate with the dispenser through one antenna or set of antennas, even if something blocks the field from the other set of antennas.

Another option is to place the antenna substantially directly over the fueling position A or B. In such an embodiment, overhead receive antenna 259 and overhead transmit antenna 261 are mounted over the fueling position A, B using an overhead antenna mount 263. The overhead antennas 261, 263 operate in the same manner as the top-mount antennas 255, 257, and may also be spaced apart to provide varying positions to create an interrogation field. Notably, the antennas for receiving and transmitting may be combined into one wherein a suitable circulator or like electronics 241 is incorporated into the interrogator or communications electronics to provide for reception and transmission from a single antenna. With any of these embodiments, the antennas may cooperate directly with the central controller 34 and/or with the dispenser controller 20 to allow overall system monitoring of transponders at the various positions. In these situations, the selected control system will alert the dispenser of transponder presence.

As noted, various combinations of these antennas can be used. For example, one embodiment includes two mid-dispenser transmit antennas 251, two top-mount transmit antennas 255, and two top-mount receive antennas 257. The top-mount receive antennas 257 are adapted to receive signals transmitted from the transponder in response to signals from either the mid-dispenser transmit antennas 251 or the top-mount transmit antennas 255. In operation, when a customer-carried transponder 102 enters the field provided by the mid-dispenser transmit antenna 251, the transmitter reflects a signal which is received by the top-mount receive antenna 257. Alternatively, vehicle-mounted transponders 202 may enter the interrogation field provided by the top-mount transmit antenna 255 and respond with a signal received by the top-mount receive antenna 257.

The interrogation fields provided by any of the transmit antennas 251, 255, 259 may be adjusted to control the size and shape of the respective fields. For example, the system may be configured to more easily distinguish between transponders carried by a person and vehicle-mounted transponders by configuring the respective interrogation fields provided by the mid-dispenser transmit antenna 251 and the top-mount transmit antenna 255 or overhead transmit antenna 259, such that the respective interrogation fields do not overlap or overlap in a desired and select pattern. Thus, communications resulting from an interrogation with the mid-dispenser transmit antenna 251 indicate a transponder carried by the customer while communications resulting from the top-mount or overhead transmit antenna 255, 259 may be indicative of vehicle-mounted transponders.

Figure 7:
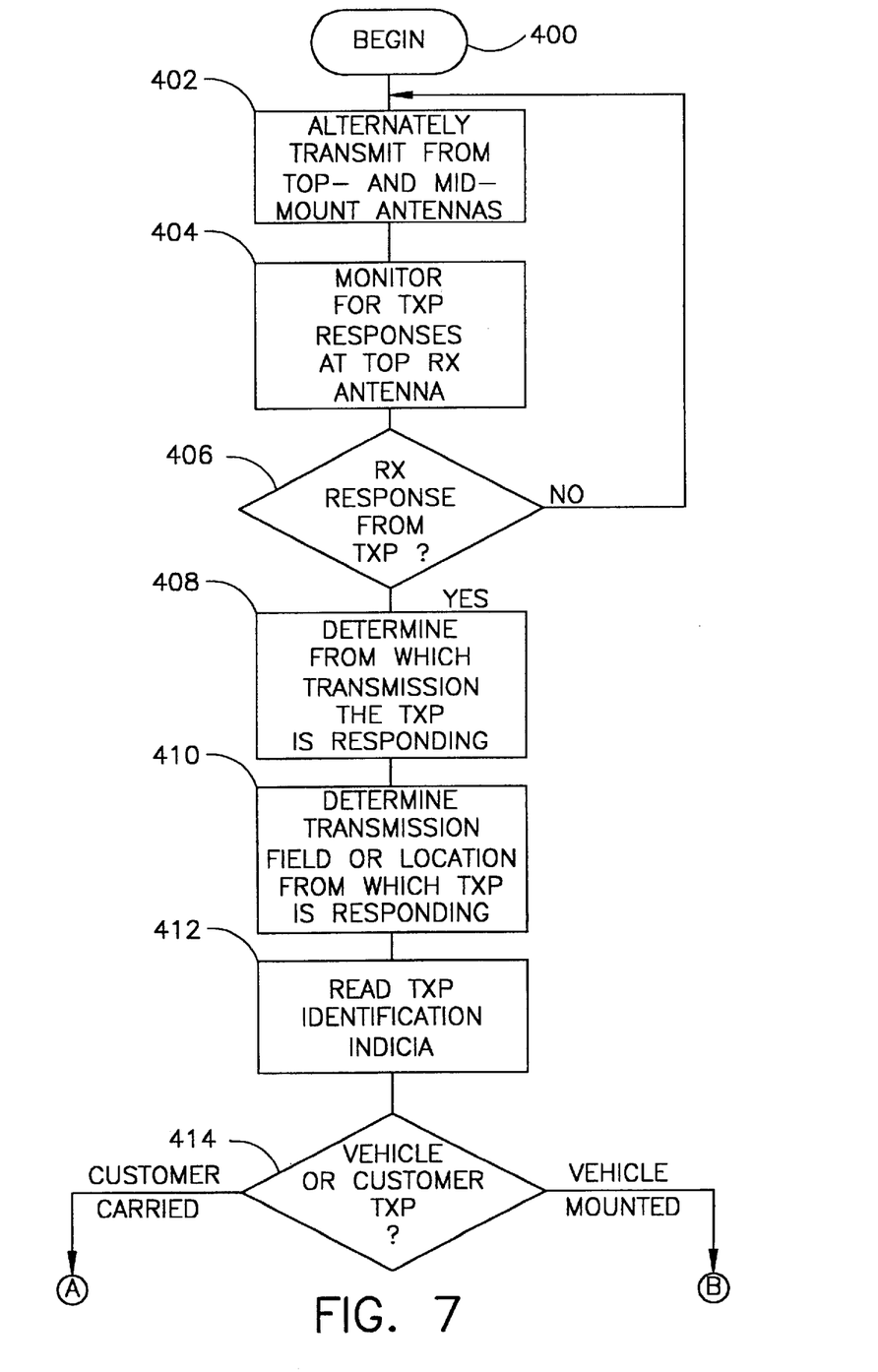
FIGS. 7 and 8 are a flow chart of a basic process for monitoring the location and type of transponder at a fueling position according to an alternative embodiment of the present invention.
Figure 8:
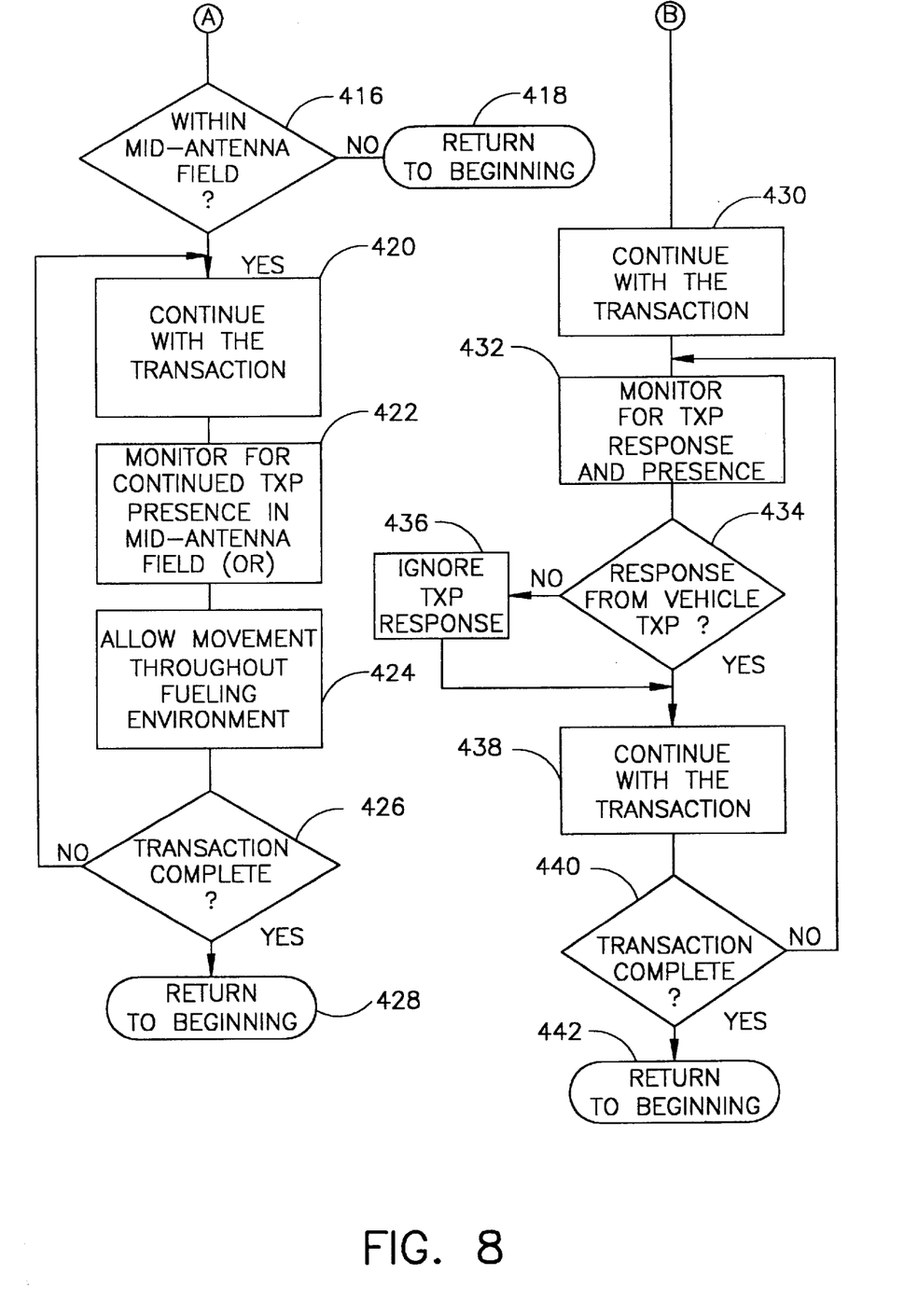

Attention is now drawn to FIGS. 7 and 8, which depict a flow chart of a basic process for monitoring the location and position of a particular type of transponder using top-mount transmit antennas 255 or overhead transmit antennas 259 and a mid-dispenser transmit antenna 251 in conjunction with one or more top-mount or overhead-mount receive antennas 257, 261. In this preferred embodiment, one or more of the transmit antennas mounted substantially above the customer will alternate sending interrogation signals with one or more of the mid-dispenser transmit antennas 251. A response to either of these interrogation signals is received at a receive antenna mounted substantially above the customer, such as one of the top-mount receive antennas 257 or overhead receive antennas 261.

The basic operation of this embodiment begins (block 400) by alternately transmitting from the top and mid-mount antennas (block 402). The central control system 50 or dispenser control system 80 will monitor for responses from transponders within one of the interrogation fields (block 404). The control system will continue to monitor for a transponder response until a signal from a transponder is received (block 406). The control system will next determine from which transmission field the transponder is responding (block 408). In this embodiment, where the transmission fields alternate, the control system will simply determine if a transponder response was received during a time period when the top or overhead-mount antennas were generating the interrogation field or if the response occurred during the time the mid-dispenser transmit antenna 251 was generating the interrogation field.

Once the control system determines the field in which the transponder is responding, the appropriate location of the transponder is known (block 410). Typically, the transponder's response to the interrogation signal provides transponder identification indicia indicative of the type of transponder being interrogated (block 412). The type of transponder is generally vehicle mounted or carried by the person. Determining whether the transponder is vehicle mounted or carried by the person enables the control system to determine how to react to the presence of other transponders passing through the various interrogation fields during a communication with another transponder or make sure a transponder is properly located for the desired transaction. If the control system determines the transponder is one carried by a person (block 414) and that the transponder was within the mid-antenna field (block 416), the control system allows the transaction to continue (block 420). If the transponder is a customer-carried transponder that is not within the mid-antenna field (blocks 414 and 416), the control system will return to the beginning of the process (block 418). The latter situation is indicative of a transponder carried by the person being interrogated in one of the top or overhead antenna fields, which are preferably used to interrogate vehicle-mounted transponders exclusively. Thus, the system preferably ignores transponders carried by the person outside of the mid-antenna field, which is preferably focused in a manner requiring the customer to be substantially in front of the customer interface of the appropriate fueling position. The field associated with the mid-dispenser transmit antenna 251 is limited only by design choice and may extend several or more feet in front and to the sides of the fuel dispenser.

If the control system is communicating with a customer-carried transponder within the mid-antenna field, the control system may monitor for the continued presence of the transponder in the mid-antenna field (block 422) or allow movement of the customer-carried transponder throughout the fueling environment (block 422). Notably, it is often desirable to only require the customer-carried transponder to be within the mid-antenna field long enough to start the transaction and fueling operation, and allow the customer to leave the fueling area during the fueling operation. Unlike a customer-carried transponder, the control system would preferably require the presence of the vehicle in the appropriate transmission field throughout the fueling operation for safety reasons. Regardless of how the control system monitors the presence or movement of the customer-carried transponder during the transaction, the transaction will continue until complete (block 426), wherein the process will begin anew (block 428).

If the control system determines a vehicle-mounted transponder is within the appropriate transmission field (block 414), the transaction will continue (block 430). Preferably, the control system will make sure that the vehicle has stopped moving and has been in position long enough to indicate a transaction associated with the responding transponder is likely. As noted above, the control system will preferably continue to monitor for the vehicle-mounted transponder's presence (block 432) throughout fueling. The control system is preferably capable of distinguishing responses from the vehicle-mounted transponder associated with the transaction from other personal or vehicle-mounted transponders entering one or more of the transmission fields (block 434). If a response to an interrogation signal is received that does not correspond to the vehicle-mounted transponder associated with the transaction, the response is ignored (block 436).

The control system may ignore all responses of customer-carried transponders in the top-mount or overhead transmission fields. Erroneous responses from other vehicles are rejected based on the control system recognizing a response from a vehicle-mounted transponder having a different identification indicia from the vehicle-mounted transponder associated with the ongoing transaction. Likewise, the control system will ignore responses from transponders other than the authorized transponders to avoid communicating with transponders of other customers entering the field during a transaction. In such case, the control system may check the identification indicia to ensure communication continue with the appropriate transponder. During this time, the control system will continue with the transaction (block 438) until the transaction is completed (block 440).

If the transaction is not complete, the control system will continue to monitor for the presence of the vehicle-mounted transponder and any other transponders in the area (blocks 432–440). Once the transaction is complete (block 440), the process returns to the beginning (block 442). Although the preferred embodiment provides for mid and overhead transmission fields wherein transponder responses are received near the top or above the dispenser, those skilled in the art will recognize that numerous modifications of this configuration are within the inventive concept disclosed herein and subject to the claims that follow.

As noted, the interrogation communications system preferably communicates using substantially directional radio frequencies in conjunction with antennas configured to provide precisely shaped and directed interrogation fields. Communications at these frequencies are generally limited to line-of-sight communications wherein arranging the antennas to cover a common interrogation field from different locations avoids parallax and the effect of interference from objects coming between the transponder and one of the antennas. Generally, communications will require the absence of metal objects coming between the antennas and transponders. Thus, when antennas are mounted within the dispenser, glass or plastic dispenser walls are preferable. Furthermore, vehicle-mounted transponders are preferably placed on the windows or behind non-metal portions of the vehicle to avoid interference.

High-gain antennas may be used to provide a highly directional and configurable cone shape covering an area most likely to include a transponder when a vehicle is properly positioned for fueling. The antenna range and transmission power is typically adjusted to provide the desired interrogation field while minimizing the potential for the transponder to reflect signals to antennas associated with other fueling positions.

Another benefit provided by an embodiment of the present invention is that spread-spectrum communications limits the likelihood that an interrogator in the system will synchronize with a transponder being interrogated by another interrogator. Thus, a preferred embodiment of the present invention provides for a communications system capable of distinguishing between transponder types, limiting the potential of transponders erroneously communicating with another interrogator, simplifying communications by using the same carrier for transmission and reception, extending the interrogation field to more easily communicate with vehicle-mounted transponders, reducing the size of the antennas required for communication, and allowing either the same or same type of antenna to be used for transmission and reception.

Additionally, the controller 20 may monitor for the presence of both a personal transponder 102 and a vehicle or transponder 202 prior to beginning fueling operation in order to validate either the personal or vehicular transponder, based on the presence of a transponder of the other type. Similarly, transponders of the same type may validate each other in like manner. Either of these embodiments may be especially useful in fleet fueling or like applications. In such applications, one or more transponders may be issued to each vehicle and be associated with a personal transponder carried by an authorized vehicle operator. Fueling may be controlled based on the presence of all associated transponders, both vehicular and personal. Once detected, the personal transponder may move about the fueling environment, while any movement at the one or more vehicle transponders may result in awaiting and/or halting fuel delivery.

Certain modifications and improvements will occur to those skilled in the art upon reading the foregoing description. It should be understood that all such modifications and improvements have been deleted herein for the sake of conciseness and readability, but are properly within the scope of the following claims.

I claim:

1. A fuel dispenser adapted to distinguish between transponder types comprising:

communication electronics adapted to receive remotely transmitted signals from a vehicle transmitter attached to a vehicle and a personal transmitter associated with a person; and a control system adapted to determine whether the remotely transmitted signals were received from the vehicle transmitter or the personal transmitter and determine if the vehicle or the personal transmitter has moved with respect to said fuel dispenser, said control system providing an output if the vehicle has moved with respect to said dispenser but not providing said output if said personal transmitter has moved in order to allow an individual with the personal transmitter to move away from said dispenser during fueling while preventing a vehicle from moving away from said dispenser during fueling.

2. The fuel dispenser of claim 1 wherein said control system is further adapted to determine if said vehicle has moved a relative distance with respect to said dispenser and provide said output when said vehicle moves the relative distance.

3. The fuel dispenser of claim 1 wherein the transmitter signals include information on vehicle movement, said control system adapted to determine if vehicle is moving based on the information.

4. The fuel dispenser of claim 1 wherein the transmitter signals include information on vehicle movement, said control system adapted to determine if the vehicle is preparing to move based on the information.

5. The fuel dispenser of claim 1 wherein said control system and said communication electronics are adapted to determine a change in proximity of the transmitter with respect to said dispenser to determine if the first transmitter has moved with respect to said dispenser.

6. The fuel dispenser of claim 5 further including an antenna associated with said communication electronics, said communication electronics and said antenna providing said control system with a proximity signal indicative of the relative signal strength of the remotely transmitted signals received from the first transmitter, said control system determining a change in said signal to detect if the first transmitter has moved with respect to said dispenser.

7. The fuel dispenser of claim 1 wherein said control system and said communication electronics are adapted to determine a change in location of the transmitter with respect to said dispenser to determine if the first transmitter has moved with respect to said dispenser.

8. The fuel dispenser of claim 7 wherein said control system and said communication electronics are associated with a plurality of antennas associated with said communication electronics and said control system, said control system adapted to determine a relative location of the first transmitter with respect to said fuel dispenser by determining differences in characteristics of the remotely transmitted signals from the first transmitter received at each of the plurality of antennas.

* * * * *